Figure 1:
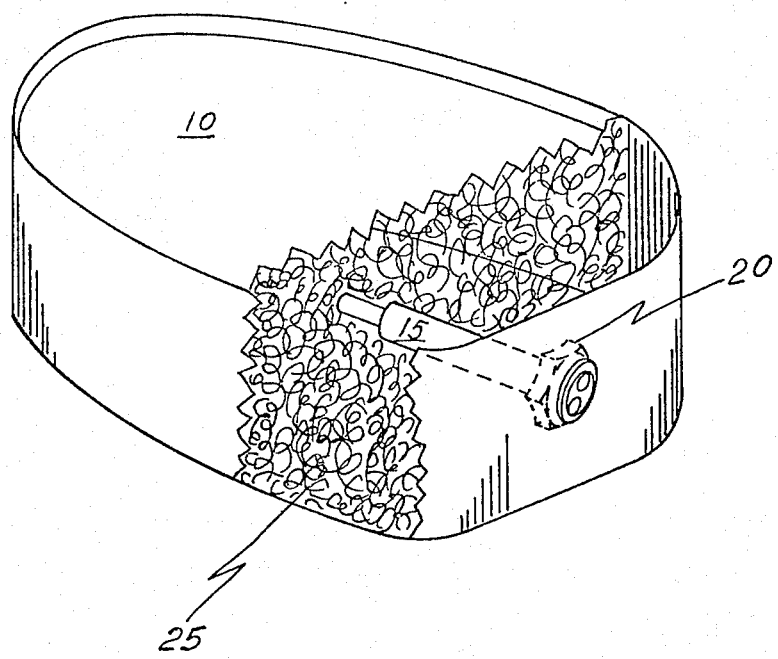

United States Patent [19]

Connick

[11] 4,003,124

[45] Jan. 18, 1977

[54] METHOD OF MAKING CANNED FOOD RECYCLABLE THERMAL SIMULATOR

[75] Inventor: Francis G. Connick, Downers Grove, Ill.

[73] Assignee: Swift and Company Limited, Chicago, Ill.

[22] Filed: Nov. 26, 1975

[21] Appl. No.: 635,658

Related U.S. Application Data

[62] Division of Ser. No. 499,296, Aug. 21, 1974, Pat. No. 3,964,313.

[52] U.S. Cl. .................................. 29/460; 53/22 R; 264/263
[51] Int. Cl.[2] ........................ B23P 3/00; B23P 19/04
[58] Field of Search ................ 29/405, 407, 460; 264/263 X; 73/52, 341, 343; 99/342, 343 R; 53/9, 22 R

[56] References Cited

UNITED STATES PATENTS

| | | | |
|---|---|---|---|
| 2,938,313 | 5/1960 | Hoppe | 53/22 R |
| 3,016,580 | 1/1962 | Jaeschke | 264/263 |
| 3,446,361 | 5/1969 | Douty | 29/460 X |
| 3,690,175 | 9/1972 | Butts | 73/343 R |
| 3,724,360 | 4/1973 | Kliewer | 99/342 |
| 3,754,465 | 8/1973 | Romito | 99/342 |
| 3,769,932 | 11/1973 | Romito | 99/342 X |
| 3,771,351 | 11/1973 | Sacks | 73/52 |
| 3,812,716 | 5/1974 | McIntyre | 73/341 |

FOREIGN PATENTS OR APPLICATIONS 146,406  8/1954  Sweden ............................ 29/460

*Primary Examiner*—Charlie T. Moon
*Attorney, Agent, or Firm*—Edward T. McCabe; Charles E. Bouton; W. C. Davis

[57] ABSTRACT

A method of reassuring internal temperaures of canned foods under actual operating conditions by placing recyclable thermal simulators in each batch of canned foods during the actual processing. A recyclable thermal simulator device having the same thermal characteristics as the particular canned food being simulated. A method for manufacturing recyclable thermal simulators by equipping a container substantially identical to those simulated with a suitable temperature indicator, filling the container with a porous, open-celled, sponge-like matrix material, uniformly distributing a liquid of a pre-determined specific gravity throughout the matrix material by means of a partial vacuum usually identical to that drawn on the canned food simulated and sealing the container. Matching the thermal characteristics of different canned foods is generally accomplished primarily by varying the matrix density, the specific gravity of the liquid, and the percentage of open cells in the matrix material and by employing identical containers and drawing the same partial vacuums used by the canned foods simulated.

13 Claims, 1 Drawing Figure

METHOD OF MAKING CANNED FOOD RECYCLABLE THERMAL SIMULATOR

This is a division, of application Ser. No. 499,296, filed Aug. 21, 1974, now U.S. Pat. No. 3,964,313.

This invention relates to a novel method and device for measuring the internal temperatures of canned foods during processing and the method for manufacturing such devices.

Historically, the conventional method of determining the internal temperature of hermetically sealed solid foods during thermal processing is by spot-checking, which is the selection of one or more samples at random from each batch in commercial processing lines and thereafter inserting a stem-type thermometer through the can wall into the centermost portion or coldest-spot of the product or that portion of the food product slowest to attain the desired temperature. The spot-check method has two primary disadvantages. The first is that it is economically costly and the second is the degree of inherent inaccuracy.

From an economic standpoint spot-checking is costly because the container is destroyed and the food product must be reprocessed into a substantially lower profit product, such as from a canned ham to canned luncheon meat. The reprocessing involves substantial labor costs for the unpacking, reprocessing and subsequent repacking of the product. In addition the end product is sold at a fraction of its original value.

The importance of accurately measuring the internal temperature of canned foods during processing is seen by the fact that insufficient heat processing will result in an improperly cooked product and may result in the growth of undesirable microorganisms which can produce product spoilage and/or illness to the consumer. Overcooking of the product is equally critical since, by its nature, it tends to adversely affect the organoleptic properties of the product and the consumer appeal of the product. Therefore it is seen that while it is essential that canned foods be heated to a critical minimum temperature, it is equally essential that the heating be kept within the critical maximum range. It also follows that the heating be as uniform as practical for all portions of the product. To insure an accurate measurement for most solid type foods, the temperature must be recorded within 1/16th inch of the centermost portion or so-called coldest-spot. The food container is generally shaped to require a uniform penetration of the externally applied heat to avoid overcooking of any portion of the contents while raising the temperature of the centermost portion to the required minimum.

The accuracy of the spot-check method is frequently impaired because it is not always possible to measure the internal temperature precisely at the centermost portion of the product. Also, once the container of the heated product is punctured, the internal pressure is released. This sudden pressure release causes the excess liquid surrounding the product which vaporizes during heating, to condense and drain to the bottom of the container. Also, the natural liquids chemically bound within the product may also be disrupted after the container is punctured.

A more recent innovation relating to the thermal testing is to cut a cylindrical hole in a side wall of the container or at a point where the thermocouple can be inserted into the product. To insert a self-sealing temperature measuring unit through the hole, the measuring unit is generally screwed into a leak-proof packing gland which is attached to the periphery of the hole cut in the container. After the product has been placed in the container, the measuring unit is thereafter inserted into the centermost part of the product or a point equal distance from the opposite sides of the container, or in the coldest-spot. Finally the canned product, with the thermocouple fitted in place is sealed under the usual partial vacuum. Despite the increased accuracy in the positioning of the thermal measuring unit into the centermost portion of the product, the disadvantages of this test method are similar to those of the spot-check method in that each test unit requires the same amount of reprocessing, handling, destruction of the container, the value loss of the meat, and is not recyclable.

A recent estimate of the cost resulting from government inspection, both federal and state, for a newly established canned ham operation, indicated that many thousands of dollars worth of supplies, labor and product devaluation would result from temperature checks of product in all aspects of the new processing liner. Normally in established production lines it is estimated that about 1/10th of one cent per pound of product is lost each year by many canning establishments as a result of present methods of quality control and maintenance of federal and state regulations. Samples are taken from each batch of certain foods, such as canned hams, for federal inspection of temperature control in addition to those taken for normal in-house quality control by the processing plant. The number of destroyed units in a process batch generally runs between 2 and 3 units per basket or may have any number of a variety of other type groupings depending on the process.

Accordingly, it is an object of the present invention to provide a method for producing a reheatable reusable thermostatic unit for interdispersing with each batch of product in the same manner as test units would normally be selected and which accurately duplicates or simulates the internal operating conditions of the canned food product being heat processed.

It is another object of the present invention to provide a recyclable device for recording the internal temperature and/or pressure of canned food products while under actual processing conditions and to accurately record the highest temperature attained by the centermost portion of the product during heat processing and any carryover temperature during chilling.

It is another object of the present invention to provide a method of accurately recording, by means of a recyclable simulator device, the internal temperature of hermetically sealed canned food products within 1/16th inch of the centermost portion of the canned product being heat processed.

It is another object of the present invention to provide materials suitable for simulating the thermo-conductivity characteristics or K-factor of hermetically sealed solid type foods during conventional canning processing.

It is another object of the present invention to accurately duplicate the liquid phase in the solid food simulated comprising suitable matrix material such as rubber and plastic open cell foams and liquid media, which is capable of providing the same thermo-conductivity characteristics or K-factor of particular foods, including meats, during the actual processing conditions.

It is yet another object of the present invention to provide a method of measuring the thermal conditions of food products during processing by providing matrix materials having varying densities and having variations in the percentage of open cells; and a liquid system comprising solutions of varying concentrations, specific heat, and/or specific gravities, in order to produce the same K-factor or thermo-conductivity characteristics of the food product being simulated.

It is still another object of the present invention to provide a method of measuring the internal temperature of different canned meat products during processing by varying the percentage of open cells in the matrix material, varying the density of the matrix material, varying the specific gravity of a liquid system used to impregnate the matrix material while under partial vacuum, so that a recyclable simulation of a particular product is produced having the same thermo-conductivity rate or the same K-factor.

It is another object of the present invention to provide a canned recyclable simulator wherein the simulated food product is meat, the simulator matrix is polyurethane having a density between from about 10 to about 35 lbs. per. cu. ft. and having from about 50 to about 75 percent open cells and the liquid system is a suitable aqueous solution having a specific gravity within the range of from about 1.0635 to about 1.2296.

In general this invention relates to a recyclable simulator device for measuring and/or recording the internal operating temperature of canned foods while under actual operating conditions. It particularly relates to the discovery that certain foam materials, such as plastics and rubbers having an open cell structure, offer an excellent matrix which when pregnated under a partial vacuum with a liquid system of a particular specific density, will provide a thermo-conductivity curve corresponding to that of a particular solid type food product while being heated. By varying the specific gravity of different liquid systems it was found that the thermo-conductivity or the K-factor of a hermetically sealed simulator device can be extended over a broad range to equal the K-factor of many different types of canned food products. The K-factor is further broadened by varying the densities of the porous, foam type materials such as rubber and/or plastics such as polyurethane compounds and by varying the percentage of open cells within the matrix. The K-factor or thermo-conductivity of many solid food products such as meats can be accurately duplicated by employing such a lightweight open celled material as a plastic foam known to have a K-factor substantially below that of the solid product being simulated.

Further objects and advantages will become apparent upon reading the following detailed disclosure of a preferred embodiment of the invention in conjunction with the drawing.

The drawing is a perspective view of an embodiment of the present invention showing a simulator device of a pearshaped ham.

In the method of producing a canned product simulator it should be kept in mind that rather specific characteristics are required in a simulated material to accurately duplicate the internal conditions produced in canned products during cooking. It will be obvious to those skilled in the art that producing thermal simulators for solid type canned foods is more difficult than producing those for liquid type canned foods. For example, when cured meats are cooked there is a transfer of chemically bound liquid present throughout the meat as the maximum temperature is reached. The conduction of heat throughout the meat is affected by the changing basis of the liquid distribution. The liquid present in the canned food product and simulator act as a prime conductor for externally applied heat. For this reason it is much easier to produce a satisfactory simulator for canned foods which are essentially in a liquid state. Therefore, the examples herein are directed to solid type canned foods; such as, comminuted meats as ground poultry, beef and/or pork luncheon meats; diced foods, such as, pressed ham or canned tuna; and, whole solid meat chunks; such as, canned hams or whole canned chickens. Because it is more difficult to control and to duplicate the moisture content, hence the thermo-conductivity, of whole solid meat chunks as compared with comminuted and diced meat products into which varying amounts of liquids can more easily be incorporated, canned hams have been selected to illustrate the utility of the present invention. These examples are cited merely as illustrative of the present invention and are not intended as restricting the scope of the appending claims. Obviously, the greater the cost factor per unit of canned food, the greater the incentive to employ such recyclable thermal simulators.

In the process of producing thermal simulators, it is preferred that the container housing of the simulator be of substantially the same thermal conductivity and physical dimensions as that of the food container being simulated. This insures that the container wall will have the same thermo-conductivity characteristics and that the externally applied heat will be conducted the same distance in the simulator as in the product being processed. For this reason, it is preferred to use the same container for the simulator as that housing the canned food being simulated. The simulator containers are then filled with a porous, open cell matrix material having a predetermined percentage of open cells and density to which a suitable amount of a liquid system having a pre-determined specific gravity, is added. The container is equipped with any suitable device for measuring the internal temperature within 1/16th inch of the centermost point or coldest-spot of the container. The container is then sealed under a partial vacuum and tested to verify it has the same K-factor or thermo-conductivity ratio as the particular food it simulates. Generally, it is preferred to have the same partial vacuum for the simulators as for the canned product being simulated.

In operation, for example, when foam type material or matrix 25, e.g., rubber or plastic (polyurethane) are being compounded, it is feasible to form or cut the material in any desired shape which would simulate the size and shape of a corresponding food container 10. The forming of these materials 25 is done so that no skin formation exists and the cell structure is then more readily impregnated with liquids when sealed under vacuum.

In addition to the usual rod or needle type thermocouple 15 any variety of sealing device 20 or measuring devices may be attached to the simulator container 10 such as those emitting an audible or an electric signal. In the more sophisticated or automated processing operations, it is possible for an electronic signal to automatically initiate the next processing step when the desired internal temperature has been attained in the cooking step. Obviously, when a plurality of simulators are employed in a single batch, each has the advantage of verifying the accuracy of the other simulators.

Examples of open cell materials found to be particularly useful are the matrix of: cellulose acetate, epoxies, phenols, polyethylene, polyols, polyethers, polystyrene, silicones, urea-formaldehyde, and the vinyl compounds. Polyurethane materials have a 1b. per. cu. ft. density of from about 10 to about 35 lbs. were found particularly useful in duplicating the thermo-conductivity curves of canned meats, particularly when combined with liquid systems using various concentrations of sucrose solutions of from about 10 to about 50 percent. An open cell matrix made from foamed plastics or rubber having from about 50 to about 75 percent open cells was found particularly useful in duplicating the thermo-conductivity of canned meats.

Liquid systems which are both easily accessible and low in cost and which have proved most satisfactory include sucrose, glycerine, sodium chloride, sodium carbonate, sodium nitrate and solutions of other chemicals having a specific gravity range of from about 1.0635 to about 1.2296.

EXAMPLE I

Polyurethane having a density of 20 lbs. per cu. ft. and about 70 percent open cells was impregnated with 16 percent aqueous sucrose solution and placed in a 3 lb. pear-shaped ham container having a stem-type thermometer positioned within to contact that portion of the interior equal distance from all sides of the container. The container was then placed under a vacuum of 27.5 inches for a time sufficient to yield a uniform distribution of the solution throughout and thereafter sealed. The simulator was tested under actual operating conditions against canned hams of the same size and weight and was found to satisfactorily duplicate the thermo-conductivity curve of the canned ham product.

EXAMPLE II

Polyurethane having a density of 15 lbs. per cu. ft. and about 75 percent open cells was impregnated with an aqueous solution of 55 percent sucrose and placed in an 8 lb. pear-shaped ham container having a stem-type thermometer placed to contact that portion of the interior equal distance from all sides of the container. The container was then placed under a vacuum of 27.5 inches for a time sufficient to yield a weight equal to the same size cured ham and thereafter sealed. The simulator was tested under actual operating conditions against canned hams of the same in size and weight and was found to satisfactorily duplicate the thermo-conductivity curve of the canned ham product.

Similar tests were made with such products as canned whole chickens, tuna, and different types of both diced and comminuted luncheon meats using foamed plastics and rubber having a matrix from about 50 to about 75 percent open cells which when impregnated with liquids of a specific density of between about 1.0635 and about 1.2296 and placed in a suitable container under conventional vacuum, satisfactorily provided the thermoconductivity curve equal to the solid type food product being duplicated.

Obviously, many variations and modifications of the invention as hereinbefore set forth may be made without departing from the spirit and scope thereof and, therefore, only those limitations should be imposed as are indicated in the appended claims.

I claim:

1. A method for producing recyclable canned food thermal simulators, comprising: filling a conventional food container with a suitable open cell porous matrix material, permanently securing any suitable thermometer to a panel of the container and positioning the thermometer to measure the internal temperature within about 1/16th inch of the centermost portion of the container, adding a suitable liquid for distribution throughout the porous matrix material when sealed under partial vacuum, said liquid having a specific gravity designed to produce the thermal conductivity constant of the canned food being simulated when subjected to the same external temperatures, drawing a partial vacuum on the filled container to distribute the liquid throughout the porous matrix material and thereafter sealing the container.

2. The method of claim 1 wherein the liquid system is selected from the group consisting of solutions of glycerine, sodium chloride, sodium carbonate, sodium nitrate, sucrose, or of other chemicals having a specific gravity range of from about 1.0635 to about 1.2296.

3. The method of claim 2 wherein the liquid is sucrose.

4. The method of claim 1 wherein the porous matrix material has a density of from about 10 to about 35 lbs. per cu. ft.

5. The method of claim 1 wherein the open cell porous matrix material is selected from the group consisting of cellulose acetate, epoxies, phenols, polyethalene, polyols, polyethers, polystyrene, silicones, urea-formaldehyde, polyurethane, and the vinyl compounds.

6. The method of claim 5 wherein the porous matrix material is polyurethane.

7. The method of claim 1 wherein the canned food simulated is of the solid type.

8. The method of claim 7 wherein the solid type food is canned meat.

9. The method of claim 8 wherein the canned meat is canned ham.

10. The method of claim 1 wherein the porous matrix material has from about 50 to about 75 percent open cells.

11. The method of claim 1 wherein the container is substantially identical to the container simulated.

12. The method of claim 1 wherein the partial vacuum is substantially identical to that drawn on the particular food simulated.

13. The method of claim 1 wherein the liquid system added has substantially the same specific gravity as the liquids within the food simulated.

* * * * *

UNITED STATES PATENT OFFICE
CERTIFICATE OF CORRECTION

PATENT NO. : 4,003,124
DATED : January 18, 1977
INVENTOR(S) : FRANCIS G. CONNICK It is certified that error appears in the above—identified patent and that said Letters Patent are hereby corrected as shown below:

The patent should show on its face that it is assigned to Swift & Company of Chicago, Illinois.

Signed and Sealed this sixteenth Day of August 1977

[SEAL]

Attest:

RUTH C. MASON
*Attesting Officer*

C. MARSHALL DANN
*Commissioner of Patents and Trademarks*